United States Patent [19]

Bratten

[11] Patent Number: 5,601,729
[45] Date of Patent: Feb. 11, 1997

[54] FILTER APPARATUS AND METHOD WITH MEDIA EDGE SEALING

[75] Inventor: Jack R. Bratten, West Bloomfield, Mich.

[73] Assignee: Filtra-Systems Company, Southfield, Mich.

[21] Appl. No.: 568,154

[22] Filed: Dec. 6, 1995

Related U.S. Application Data

[60] Continuation-in-part of Ser. No. 535,546, Sep. 28, 1995, which is a division of Ser. No. 813,161, Dec. 24, 1991, abandoned.

[51] Int. Cl.⁶ .............................. B01D 37/00; B01D 33/00
[52] U.S. Cl. .......................... 210/783; 210/387; 210/400; 210/401; 210/406
[58] Field of Search ................................ 210/387, 400, 210/401, 406, 137, 783

[56] References Cited

U.S. PATENT DOCUMENTS

| 3,087,620 | 4/1963 | Hirs. | |
|---|---|---|---|
| 3,221,885 | 12/1965 | Hirs. | |
| 3,358,834 | 12/1967 | El-Hindi | 210/401 |
| 3,375,932 | 4/1968 | Ishigaki | 210/401 |
| 3,677,411 | 7/1972 | Ishigaki | 210/401 |
| 3,741,389 | 6/1973 | Anderson | 210/387 |
| 3,876,547 | 4/1975 | Kaess | 210/401 |
| 4,062,780 | 12/1977 | Estabrook | 210/401 |
| 4,137,062 | 1/1979 | Mullerheim et al. | 210/387 |
| 4,181,616 | 1/1980 | Bahr | 210/297 |
| 4,212,745 | 7/1980 | Jellesma | 210/401 |
| 4,220,539 | 9/1980 | Lee | 210/387 |
| 4,390,428 | 6/1983 | Bratten | 210/400 |
| 4,396,505 | 8/1983 | Wilson et al. | 210/387 |
| 4,421,647 | 12/1983 | Estabrook et al. | 210/401 |
| 4,481,108 | 11/1984 | Bratten | 210/387 |
| 4,514,301 | 4/1985 | Parshall | 210/400 |
| 4,774,010 | 9/1988 | Bratten | 210/387 |
| 4,963,259 | 10/1990 | Barcomb et al. | 210/401 |
| 5,089,143 | 2/1992 | Anderson | 210/401 |
| 5,118,420 | 6/1992 | Galletti | 210/401 |
| 5,209,841 | 5/1993 | Bratten | 210/400 |
| 5,417,850 | 5/1995 | Schimion et al. | 210/387 |

Primary Examiner—Robert J. Popovics
Attorney, Agent, or Firm—John R. Benefiel

[57] ABSTRACT

A filter apparatus and method use a permanent filter media belt to support a disposable filter media strip which are indexed over a vacuum chamber perforate cover plate at the bottom of a tank containing liquid to be filtered. A flight conveyor frictionally engages the disposable media strip to index both the disposable media strip and the permanent media belt. The side edges are each extended out into a seal enclosure containing an inflatable tube seal, each pressurized to seal the side edges during filtration, the tubes depressurized when the media are indexed.

3 Claims, 3 Drawing Sheets

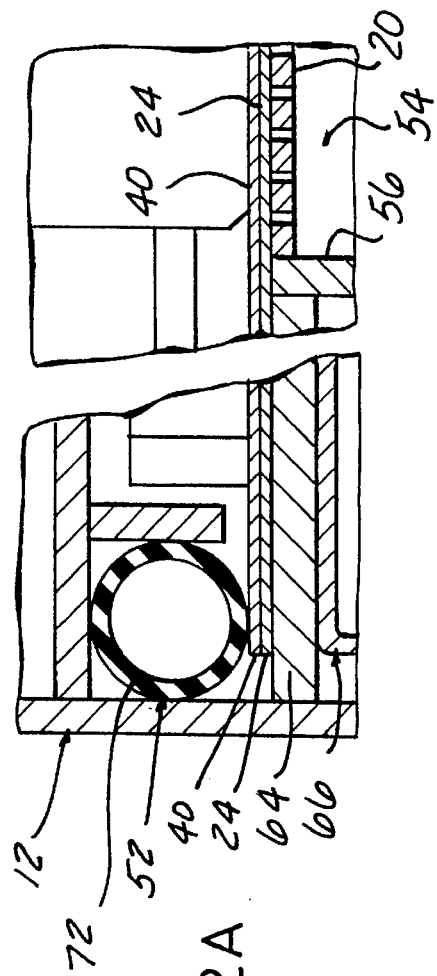
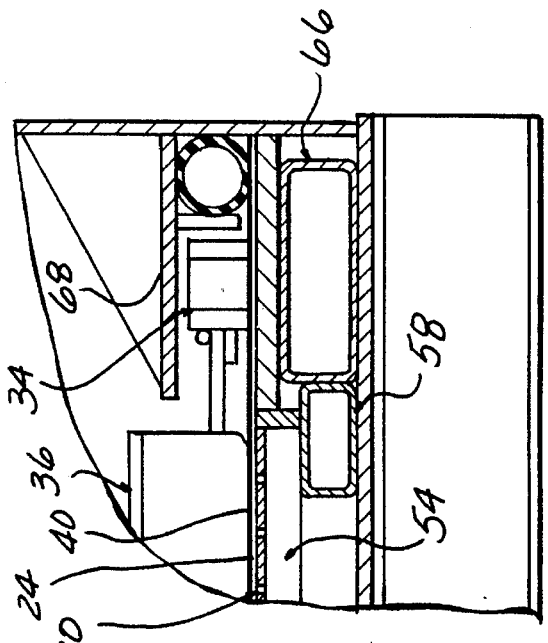
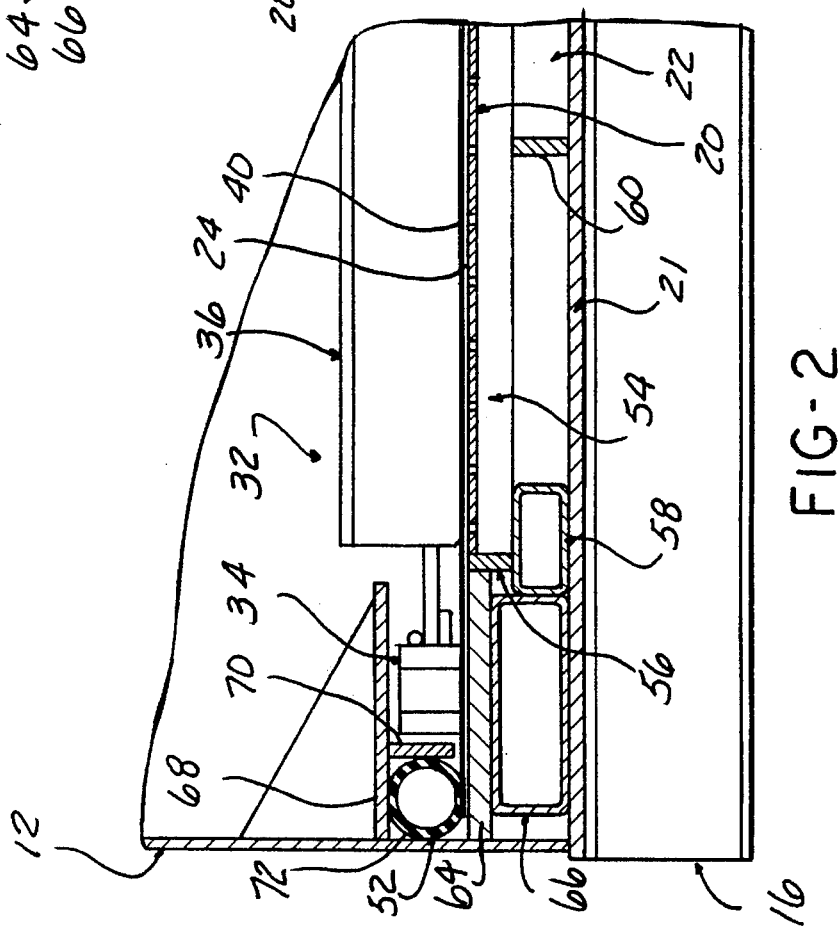
FIG-2A
FIG-2

FILTER APPARATUS AND METHOD WITH MEDIA EDGE SEALING

This application is a continuation-in-part of U.S. Ser. No. 08/535,546, filed on Sep. 28, 1995, which is a division of U.S. Ser. No. 07/813,161, filed on Dec. 24, 1991, now abandoned.

BACKGROUND OF THE INVENTION

This invention concerns filtration apparatus, and more particularly filters of the type in which a strip or belt of filter media is moved over a perforated plate support in a tank adapted to receive a liquid to be filtered. A vacuum is developed in the space below the perforated plate to draw liquid through the media to filter the liquid. The media is periodically indexed to bring a fresh segment atop the perforated plate and carry the previous segment with its accumulated solids out of the tank.

Such apparatus is typically used with production metalworking transfer lines to filter liquid coolants and machining fluids to remove chips, grit, etc. to allow reuse of the liquid.

The filter media can take the form of a "permanent" fabric belt which is indexed periodically as the belt becomes clogged, each indexed segment cleaned and recirculated. Alternatively, a very lightweight disposable synthetic media strip can be indexed through the tank, each segment of which collected for disposal after use.

The media is often driven with a flight conveyor having chain loops connected by flights extending across the width of the permanent media belt, which flights act to also carry the removed solids such as machining chips out of the tank.

The conveyor can either be attached to the media (in the case of permanent media belts), or merely frictionally engaged to drive the same. The frictional engagement is used with disposable media.

A recurrent problem is the sealing of the media edges to prevent solids from getting under the edges and allowing unfiltered liquid to pass into the vacuum box or to clog the perforated plate.

It has heretofore been proposed to use segments of inflatable tubing which extend along the side edges of the media and which are inflated with air or liquid during filtering and deflated during indexing.

U.S. Pat. No. 4,390,428 issued on Jun. 28, 1983 for a "Filtration Apparatus" shows such an arrangement used with a permanent media belt attacked to a conveyor. This arrangement does not allow the use of disposable media, which is sometimes desirable even with a permanent media filter as described in the above-referenced copending patent applications.

The attachment of the permanent media belt to the conveyors often leads to problems, as the belt may lengthen or shrink when soaked in liquid, to be mismatched in length to the conveyor, this mismatch creating gathering and leakage of unfiltered liquid past the media.

U. S. Pat. No. 4,481,108 issued on Nov. 6, 1988 for a "Belt Filter" describes disposable media strip pulled through the tank and inflatable sealing tubes used to seal the side edges while keeping the side edges flat. The pulling drive does not allow the use of a chain conveyor to move filtered solids out of the tank and the indexing pulling drive is complex and requires manual advance of the media through the tank when replacing a roll of media. Also, the very light weight of the disposable media allows the media to float off the support plate when air bubbles are present, unless sufficient cake is on the media. The flight conveyor functions to counter this tendency.

U.S. Pat. No. 4,747,010 issued on Sep. 27, 1988 for a "Tank Filter with Conveyor Flight Driven Filter Media Belt" describes disposable media frictionally driven with a chain flight conveyor. The disposable media has little body when wet by the liquid, and cannot extend out much from the conveyor contact with gathering and bunching, and eventually wadding under the conveyor chains and flights. This destroys the integrity of the media allowing bypass of unfiltered liquid. Hence, it is not feasible to improve edge sealing with an inflatable seal as in the above patents.

It is an object of the present invention to provide a filter apparatus and method using disposable media of the type using periodically indexed media with improved edge sealing.

SUMMARY OF THE INVENTION

The above-recited object of the present invention is accomplished by using a permanent media belt in combination with disposable media overlying the permanent media belt, frictionally driving both media by frictional contact of the disposable media with a flight conveyor, as in the above-referenced copending applications.

The side edges of the permanent media belt as well as the disposable media extend out a substantial distance from the flight conveyor, the permanent media stiffness supporting the disposable media so that the outward portions thereof do not bunch or fold but remain flat.

A seal confinement compartment is provided over each side edge, in which an inflatable tube is disposed. The tubes are inflated during filtration to completely seal the media edges and deflated during indexing to allow free movement of the media.

DESCRIPTION OF THE DRAWINGS

FIG. 2 is a fragmentary sectional view taken through a portion of the filter apparatus shown in FIG. 1.

FIG. 2A is a fragmentary sectional view of the left side of the filter, showing the disposable media lying atop the permanent media belt.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
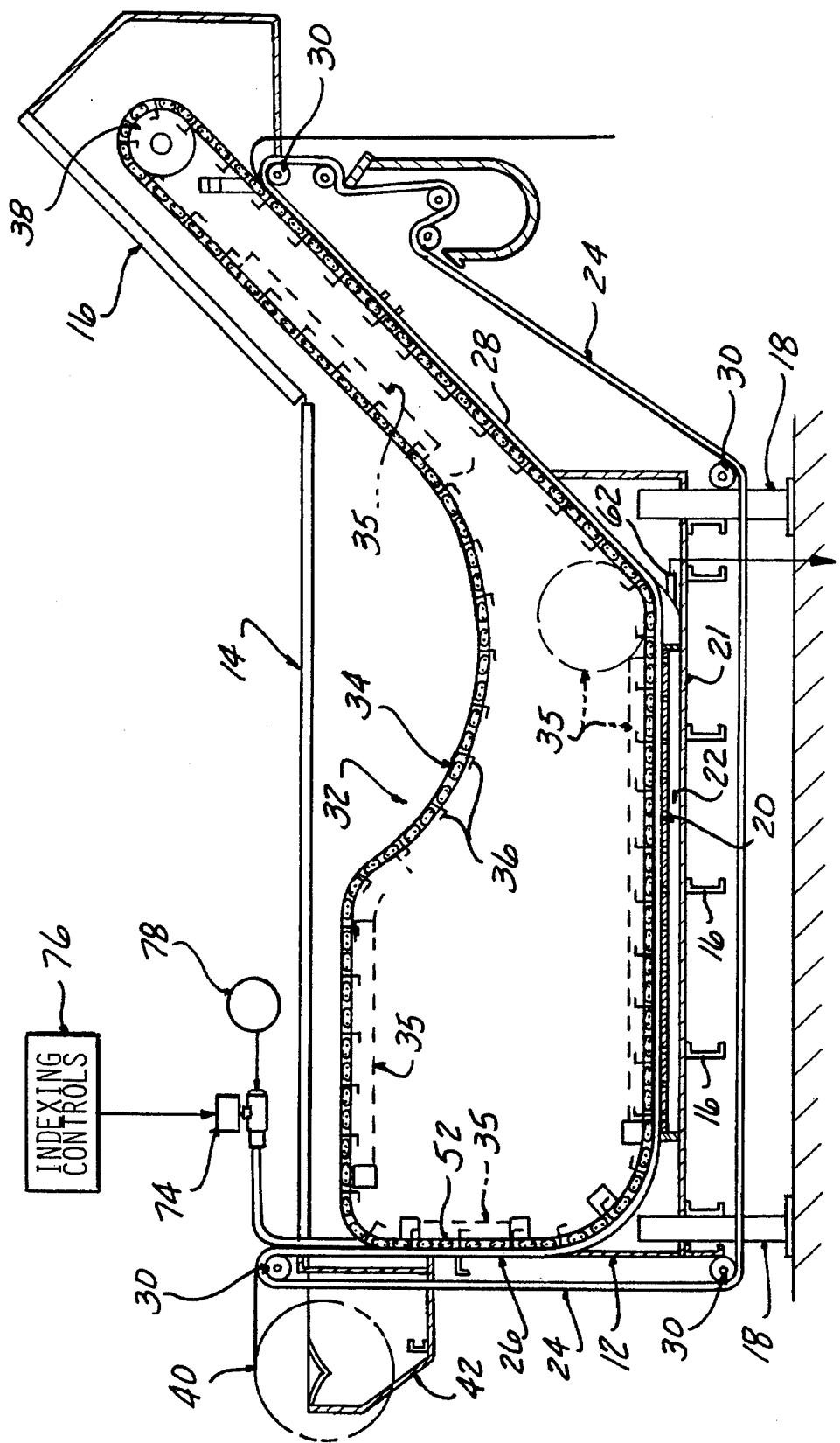
FIG. 1 is a simplified representation of a filter apparatus according to the present invention in longitudinal section.

Referring to the drawings, FIG. 1 represents the filter apparatus 10 according to the present invention, which includes a tank 12 open to atmospheric pressure, which receives liquid to be filtered from a system requiring the return of the filtered liquid for reuse in the system.

The tank 12 may be provided with suitable covers 14, shielding 16, bottom reinforcements 18, and supported on legs 19 to be positioned spaced above a supporting surface.

The tank 12 has a perforated plate 20 supported over a major region of the tank floor 21, defining a vacuum box 22 into which filtered liquid is drawn, after passing through a segment of filter media overlying the perforated plate 20.

The filter media takes the form of an endless permanent media belt 24 arranged to recirculate down the inside of the tank entrance wall 26 at the left of FIG. 1, across the perforated plate 20, up the inclined exit wall 28 at the right, out of the tank 12 and back across the space below the tank and back up the entrance wall prior to reentry into the tank 12.

The permanent media belt is supported on idler pulleys 30 along its recirculation path to be freely movable therealong.

The permanent media belt 24 is frictionally driven by a powered flight conveyor loop 32 comprised of two endless chain loops 34 located spaced apart, each adjacent one sidewall of the tank 12, connected by flights 36 extending across the width of the tank 12.

The flight conveyor 32 also extends in a recirculating path including a segment extending down the inside of the entrance tank wall 26, across the perforated plate 20, up the inclined exit wall 28 at the right, out of the tank 12 and back across the space below the tank, and back up the entrance wall prior to entry into the tank 12.

The permanent media belt 24 is frictionally driven by a powered flight conveyor 32 comprised of two endless chain loops 34 located spaced apart adjacent the sides of the tank 12, connected by flights 36 extending across the width of the tank 12.

The flight conveyor 32 also extends in a recirculating path including a segment extending down the inside of the entrance of the tank wall 26, across the perforated plate 20, up the inclined exit wall 28, and around powered drive sprockets 38 and back across the top of tank 12. Fixed chain guides 35 are arranged on the inside of each side of the tank 12 to support and guide the chain loops in their recirculating paths.

The chains 34 and flights 36 frictionally engage the permanent media felt 24 and drive the belt during index to periodically advance a fresh segment onto the perforated plate 20.

A roll of disposable media 40 is mounted at the entrance end of the tank above the wall 26 on a bracket 42. Since the permanent media belt 24 and the flight conveyor 32 have divergent paths at this point, the disposable media 40 can be introduced between the flights 36 and the permanent media belt 24. The flight conveyor 32 then frictionally drives the disposable media 40 and indirectly the permanent media belt 24 as well, as described in the above-referenced copending patent applications.

The disposable media passes out of the tank 12 where it may be collected for disposal by a suitable collection conveyor 44 or rewinder.

The permanent media belt 24 comprises a porous flexible strip material of suitable durability, such as a synthetic or natural fiber woven fabric, while the disposable media 40 is a commercially available porous paper.

If the filter apparatus is operated without the disposable media 40, a suitable scraping and washing of the permanent media belt 24 can be provided, including scraper 46 and washing nozzles 48 positioned over collection trough 50, all as shown in FIG. 1.

According to the concept of the present invention, a pair of inflatable seals 52 are provided, each comprised of a length of tubing, one on each side of the permanent media belt 24 extending above the liquid level on either end.

As shown in FIG. 2, the tank 12 includes a pair of side plates 52 welded to the tank floor 21. The vacuum chamber 22 is reinforced with cross spacer bars 54 welded to a perimeter frame 56, resting on a box tubing frame 58. Lengthwise bars 60 support the cross bars 54 while allowing flow of collected filtered liquid out of the vacuum chamber 22 to an outlet 62 (FIG. 1).

The flight conveyor 32 and flights 36 extend across the perforated plate 20 lying atop the permanent filter media belt 24, while the chains 34 are located at an outboard location lying atop a support plate 64, underlain by box tube sections 66.

The elongated cover plate 68 is welded to each side plate 52 projecting inwardly over each chain 34 to protect against jamming with chips, etc., which may be contained in the unfiltered liquid.

The permanent media belt 24 extends beyond the perforated plate 20 and beneath each conveyor chain 34 to be frictionally engaged thereby.

The permanent media belt also extends substantially beyond the chains 34 and into a seal constraint enclosure 72 via a clearance gap beneath a vertical bar 70 welded to the underside of the cover plate 68. The inflatable seals 52 each consist of tubing lengths confined within a chamber 72.

A solenoid valve 74 is operated by the indexing control 76 so as to connect each tube with a source 78 of fluid under regulated pressure. Such fluid may be shop air or pressurized liquid so as to expand the seals 52 to sealingly be pressed against the outboard edge of each side of the permanent media belt 24, the confinement of each seal in the enclosure 72 enabling the sealing pressure to be developed.

When used, the disposable media 40 also extends outwardly past the chains 34 to enter the seal chambers 72 and be engaged by the seals 52 when inflated, as shown in FIG. 2A.

The seal tubing extends along the path of the permanent media belt within the tank 12, passing out of the tank 12 to insure that the entire immersed segments of permanent media belt 24 and disposable media 40 are sealed against bypass of liquid around the edges.

The disposable media 40 is supported by the relatively stiff permanent media belt 24, reinforcing the same. It has been found that this allows the disposable media 40 to extend out beyond the chains 34, but to not gather, bunch, or wad as the permanent media belt 24 and disposable media 40 are frictionally driven by the flight conveyor 32. Hence the effective sealing of the outboard edges is consistently maintained when the seals 52 are inflated.

The seals 52 when depressurized exhibit a buoyancy in the liquid in the tank 12 to remove any pressure on the media and allow free indexing thereof without significant frictional drag on the seals 52.

Figure 3:
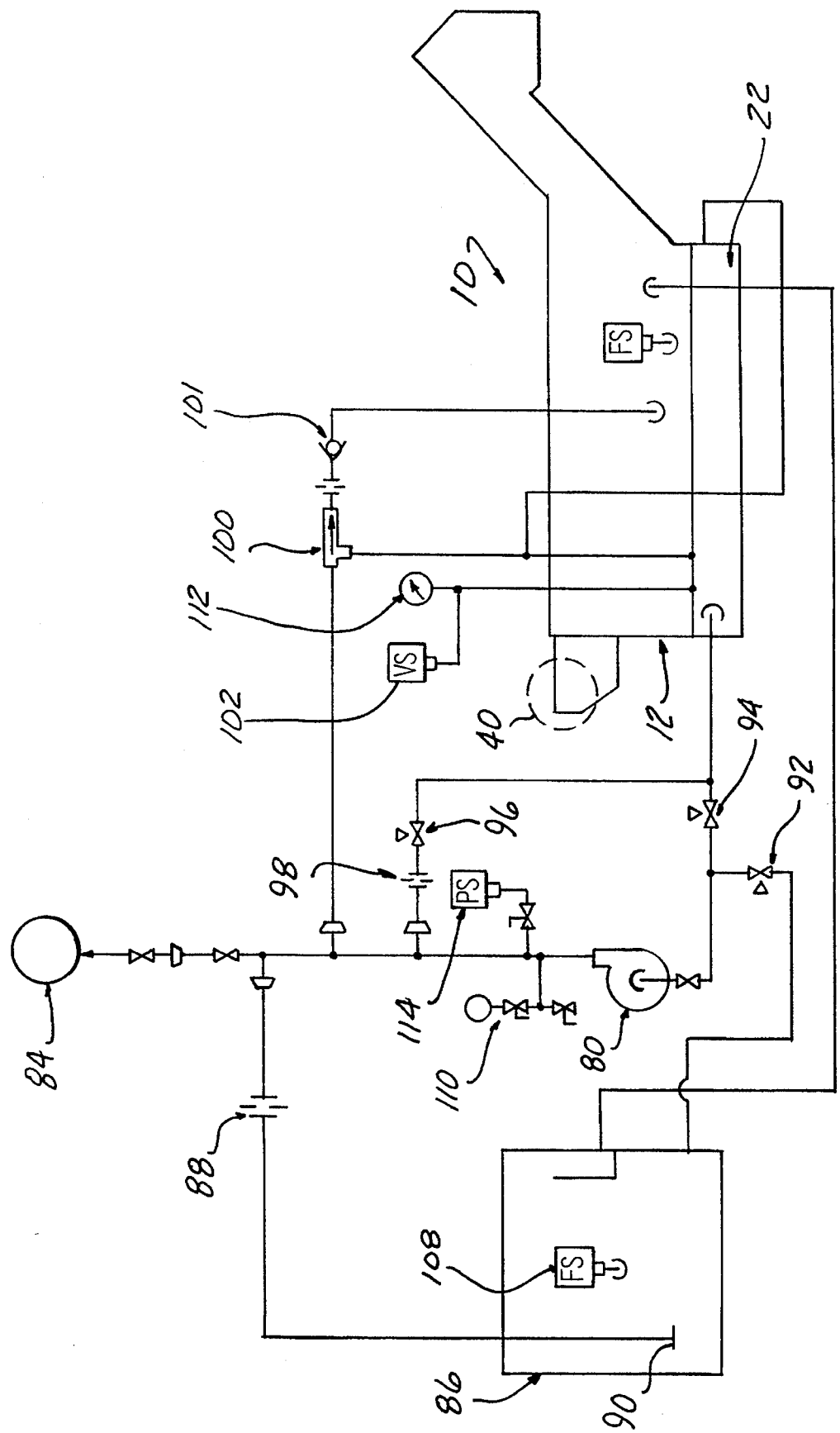
FIG. 3 is a schematic of the controls for the filter apparatus of FIG. 1.

FIG. 3 shows valving and connections for the filter apparatus 10.

A pump 70 has its inlet connected to the vacuum chamber 32 to draw filtered liquid out and direct the same to the utilizing system 84.

A portion of the pump output flow is diverted to a clean tank 86 via a flow limiting orifice union 88 and fixed orifice 90.

When an indexing cycle begins, a normally closed valve 92 is opened allowing the pump 80 to draw clean liquid from the clean tank 86 so that the flow of clean liquid is not interrupted.

A normally open valve 94 is closed to discontinue outflow from the vacuum chamber 22.

At the same time, a second normally closed valve 96 is opened to allow a controlled volume of flow of clean liquid through an orifice union 98 to be diverted to the vacuum chamber 22 to insure that the vacuum condition no longer exists prior to indexing of the flight conveyor 32.

An air bleed system includes an ejector 100 and check valve 101 receiving flow of filtered liquid which create a vacuum in excess of pump vacuum in a connection at the top and front of the vacuum chamber 22, drawing any air accumulation out and into the tank 12 where it can be released.

The indexing may be initiated at a particular vacuum level developed with a given level of solids accumulation, sensed by switch 102, or by suitable manual or timer controls, all in the manner well known to those skilled in this art.

The clean tank 86 can overflow into a subchamber 104 connected to allow flow back to the tank 12 so as to allow continuous flow and thus to eliminate the need for control valves.

Various sensors, such as a level sensor 108, pressure gauges 110, 112 are normally included for monitoring of the system. A pump pressure switch 114 can also be provided to cause a system shutdown if pressure declines below a predetermined level as a result of a malfunction or clogging.

Accordingly, reliable edge sealing for a filter using disposable media has been provided to achieve the object of the invention.

I claim:

1. A filter apparatus comprising:

a tank having an interior space adapted to receive a liquid to be filtered, and a vacuum chamber defined in part by a plate at the bottom of said tank having openings therein allowing liquid to flow from said interior space into said vacuum chamber;

an outlet from said vacuum chamber and a pump for drawing liquid out of said vacuum chamber;

an endless permanent media belt extending in a recirculating path and entering said tank from an entrance end of said tank, extending through said tank interior space across the bottom thereof over the top of said plate, passing out of said tank at an exit end thereof, and passing around the bottom of said tank back to said entering end of said tank;

guide means guiding movement of said permanent media belt along said recirculating path;

a flight conveyor loop comprised of a pair of chain loops each on a respective side of said tank, and a series of spaced apart flights connected at either end to a respective chain loop, said flight conveyor entering said tank at said entrance end, extending through said tank interior space across the bottom thereof lying over a segment of said permanent media belt disposed on said plate and extending out of said tank interior space and back over said tank to said entrance end;

drive means for periodically incrementally indexing said flight conveyor;

a strip of disposable media extending over said segment of said permanent media belt, said disposable filter media frictionally engaged by said flight conveyor, said advance of said flight conveyor indexing both said permanent media belt and said strip of disposable filter media solely by said frictional engagement;

said permanent media belt and said disposable media strip having side edges extending substantially outwardly past said chain loops;

a sealing enclosure on each side of said tank interior space extending alongside each chain loop segment extending across said tank bottom, each enclosure receiving a side edge of said permanent media belt segment and disposable media strip;

an inflatable tube seal in each enclosure extending throughout the liquid level in said tank; and, means for inflating each of said tube seals with pressurized fluid during filtering and deflating said tube seals during indexing.

2. The filter apparatus according to claim 1 wherein each seal recess includes a gap with said permanent media belt and disposable media strip side edges inserted in said gap.

3. In a tank filter of the type having a vacuum box in a tank covered with a perforate plate adapted to be overlain with permanent filter media belt and a strip of disposable filter media to carry out filtration of a liquid in the tank, the method of sealing side edges of the permanent media belt and the disposable media strip disposed thereon comprising the steps of:

mounting a permanent filter media belt loop so as to extend along a path through said tank and across said vacuum box perforate plate, out one end of said tank, down around the bottom of said tank and back into the other end of said tank;

inserting a section of disposable filter media strip into a convergent space defined between a portion of said conveyor and said permanent filter media belt;

indexing said permanent filter media belt and said disposable media strip across said perforate plate through said path solely by frictionally engaging a segment of said permanent filter media belt with a powered flight conveyor loop mounted above said tank by positioning a lower segment of said conveyor to frictionally engage a portion of said disposable filter media strip extending across said vacuum box perforate plate to drive said disposable media strip and said permanent filter media belt through said path to simultaneously advance successive segments of each onto said perforate cover;

extending the side edges of said permanent media belt and said disposable media strip substantially outward of said flight conveyor;

mounting an inflatable tube seal in a confining recess extended along and over each of said side edges; and, inflating each tube seal to engage and seal said disposable media strip respective side edge, as well as the side edges of said underlying permanent media belt.

* * * * *